H. GREER, Jr.
DUMPING CAR.
APPLICATION FILED NOV. 14, 1910.

1,035,578.

Patented Aug. 13, 1912.
7 SHEETS—SHEET 1.

Witnesses:

Inventor:
Howard Greer Jr
By: Brown & Hopkins
Attys.

H. GREER, Jr.
DUMPING CAR.
APPLICATION FILED NOV. 14, 1910.

1,035,578.

Patented Aug. 13, 1912.
7 SHEETS—SHEET 2.

Witnesses:

Inventor:
Howard Greer Jr.
By: Brown & Hopkins
Attys.

H. GREER, Jr.
DUMPING CAR.
APPLICATION FILED NOV. 14, 1910.

1,035,578.

Patented Aug. 13, 1912.

Witnesses:
G. W. Domarus Jr.
J. A. Jochum Jr.

Inventor:
Howard Greer Jr
By: Brown & Hopkins
Atty's:

H. GREER, Jr.
DUMPING CAR.
APPLICATION FILED NOV. 14, 1910.

1,035,578.

Patented Aug. 13, 1912.
7 SHEETS—SHEET 7.

Witnesses:

Inventor:
Howard Greer Jr
By: Brown Hopkins
Attys:

UNITED STATES PATENT OFFICE.

HOWARD GREER, JR., OF EVANSTON, ILLINOIS, ASSIGNOR TO CARTER H. FITZ-HUGH AND FREDERICK P. LUTHER, BOTH OF CHICAGO, ILLINOIS.

DUMPING-CAR.

1,035,578.  Specification of Letters Patent.  Patented Aug. 13, 1912.

Application filed November 14, 1910. Serial No. 592,166.

*To all whom it may concern:*

Be it known that I, HOWARD GREER, Jr., a citizen of the United States, residing at Evanston, in the county of Cook and State of Illinois, have invented certain new and useful Improvements in Dumping-Cars, of which the following is a specification.

In cars of this character the bodies are maintained against dumping action by means of chains secured to the body of the car and which are also anchored to the truck frames and these chains are submitted to severe strains and sudden shocks due to the surging of the car, with the result that the chains frequently break, thereby causing considerable damage and inconvenience. To overcome these objections and difficulties and to provide improved means whereby the truck springs may be utilized for compensating the strains and shocks on the chains, without interfering with the cushioning action on the springs on the car body, is one of the objects of the present invention.

A further object is to provide improved means whereby the chains may be readily secured in position and as readily detached or removed when desired.

A further object is to provide an improved door construction whereby the doors will be reinforced and braced equally throughout their length.

A still further object is to provide an improved end structure for the car.

A further object is to provide an improved car of this character which will be simple, durable and cheap in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings showing an exemplification of the invention, and in which—

Figure 3:
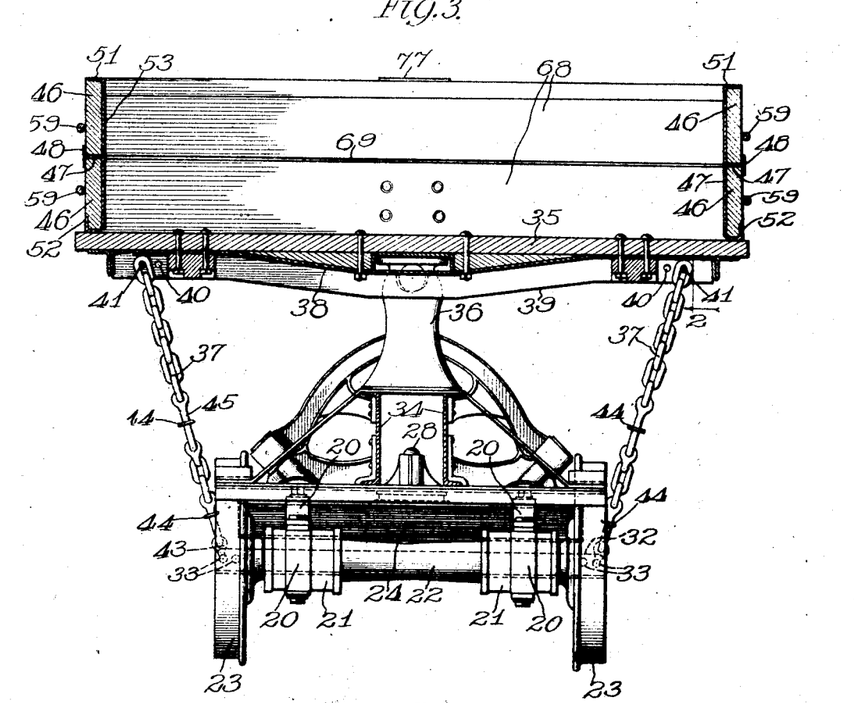
Fig. 3 is a sectional view taken on line 3—3, Fig. 1.
Figure 4:
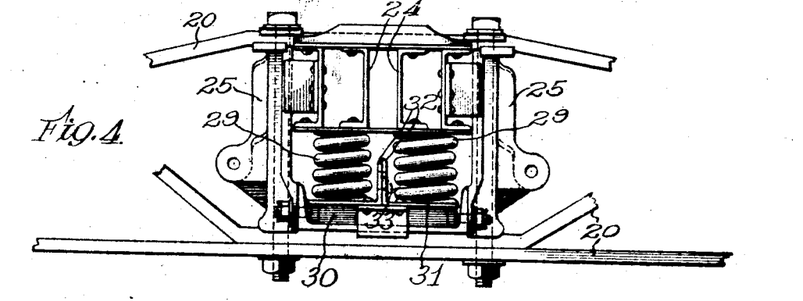
Fig. 4 is an enlarged detail elevation of a portion of the truck frame showing the cushioning springs for the truck bolster.
Figures 5, 6, 7:
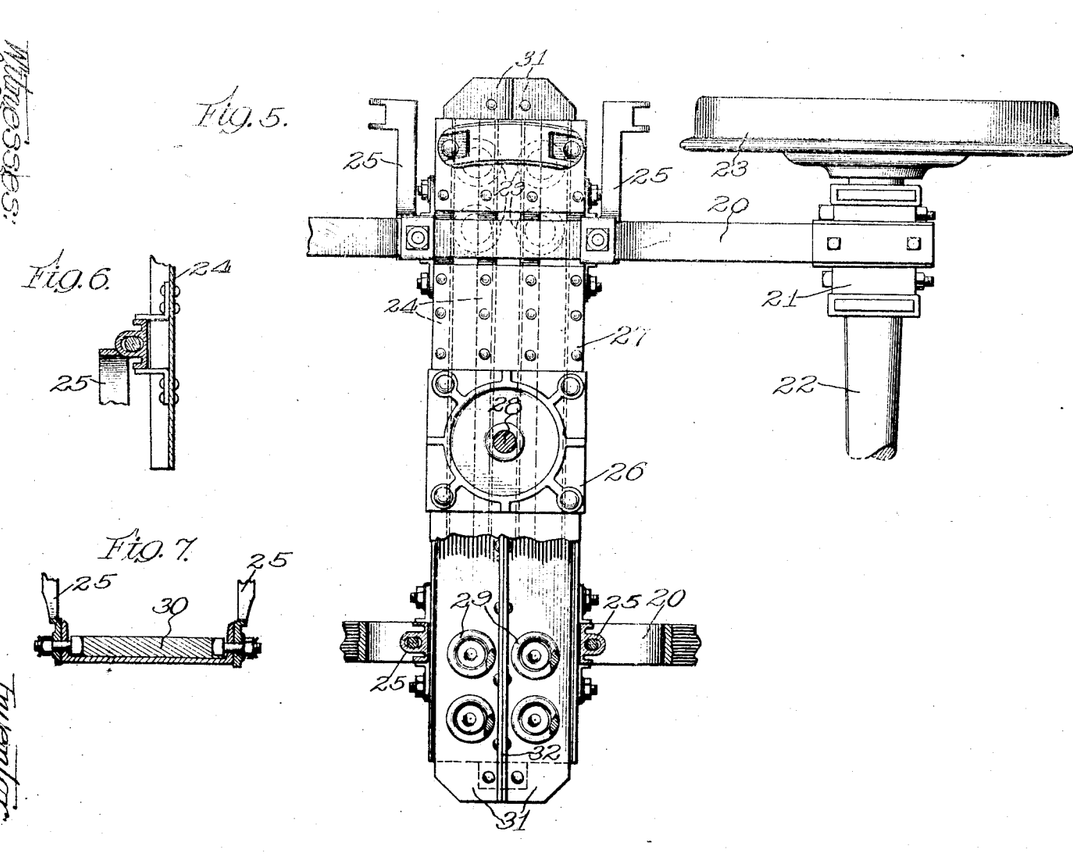
Fig. 5 is a detail top plan view partly in section and with parts removed, showing the truck bolster and the compensating means for the body chains.
Fig. 6 is an enlarged detail sectional view of a portion of the bolster guide.
Fig. 7 is a detail view partly in section of the spring plank.

Referring more particularly to the drawings and in the present exemplification of the invention the numeral 20 designates generally the side bars of the car truck which support the journals 21 for the axles 22 of the wheels 23. The ends of the truck bolster 24 are adapted to move between the usual bolster guides 25 supported by the side bars 20 of the truck and may be of any desired construction but are preferably constructed of angle irons. The center plate 26 of the bolster is secured to the top plate 27 and is provided with the usual aperture for the king pin 28. The springs 29 rest upon the spring plank 30 and disposed between the ends of the springs 29 and the spring plank 30 is a plate or member designated generally by the reference numeral 31, which is preferably constructed of two angle irons, the portions 32 of which rest against each other and project upwardly above the spring plank 30 so as to stand between the springs 29. This plate or member 31 projects beyond the bolster 24 for a slight distance, as shown more clearly in Fig. 5, and the flanged portion 32 beyond the end of the bolster is provided with one or more apertures 33, shown more clearly in Fig. 3. The sills 34 of the car rest upon the truck bolster and the car body 35 is supported by the sills 34 through the medium of pedestals 36 and the car body has a pivotal movement with respect to the pedestals whereby the car may be dumped to one side or the other of the truck.

Figures 1, 2:
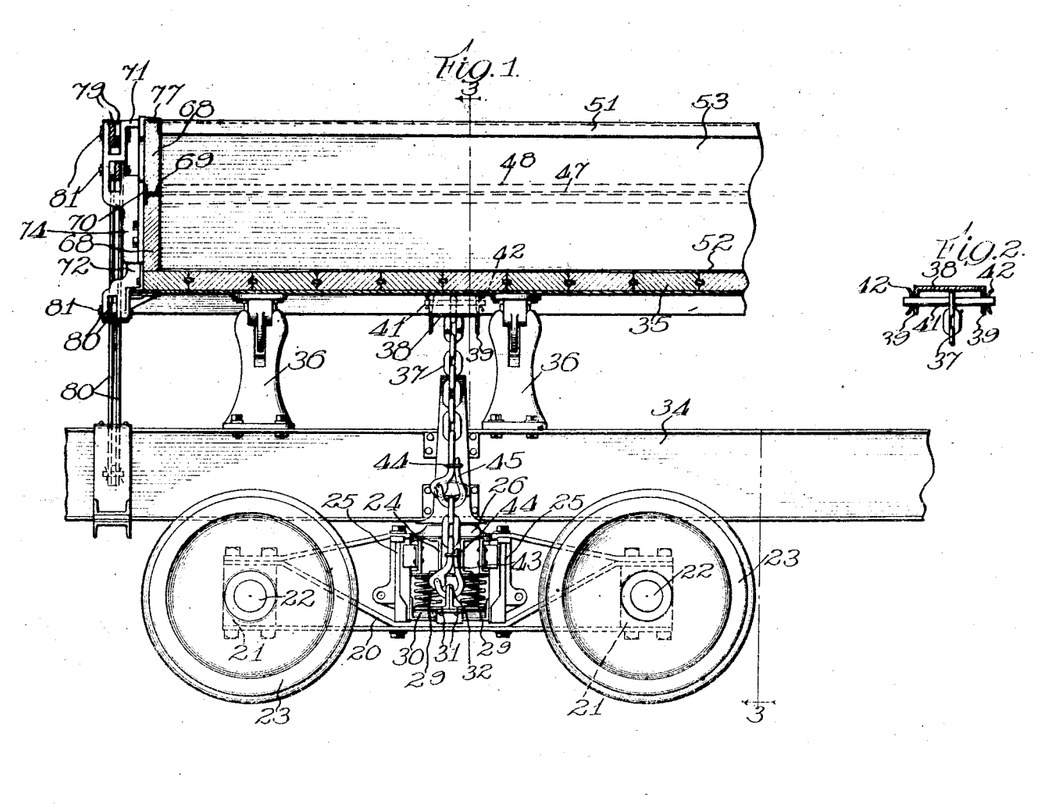
Figure 1 is a detail view partly in elevation and partly in section of one end of an improved car of this character constructed in accordance with the principles of this invention.
Fig. 2 is a detail sectional view on line 2—2, Fig. 3.

The car body 35 is maintained against its dumping movement by means of the chains 37 which latter may be of any ordinary construction. One extremity of each of the chains is secured to the car body 35 and in order that this end may be readily detached from the car body when desired, a detachable fastening means which will now be described is provided. The bottom of the car body may be braced by means of channel irons 38, any number of which may be provided, and the flanges 39 thereof are provided with registering apertures 40 (see particularly Figs. 2 and 3). A fastening pin or bolt 41 passes through registering apertures in the flanges 39 and also through one of the links of the chain 37. The fastening pin is held against accidental displacement by means of cotter pins 42 which pass through each end of the fastening pin 41 and on the outside of the flanges 39. Thus it will be seen that in the event of the bending of the pin or bolt 41 either one or the other of the cotter pins 42 may be removed and the fastening pin or bolt readily removed. The flanges 39 being spaced some distance from each other, the end of the chain 37 will be capable of movement between the flanges 39 and on the fastening pin or bolt 41 to permit the car to travel around a curve which will cause the end of the chain to slide on the fastening pin or bolt 41 and thereby prevent wrenching or damaging of the parts. The other extremity of each of the chains 37 is detachably secured to the flanged portion 32 which is disposed between the springs 29 and which rests upon the spring plank 30, and for this purpose fastening hooks 43 are provided on the end of the chain, one end of which hook is pivotally connected to the chain so that it may be passed through either one of the apertures 33 in the flanged portion 32 on the end of the plate which projects beyond the bolster and a link 44 is provided which detachably engages the extremity of the hook portion 43. It will thus be manifest that when it is desired to dump the car body 35 all that is necessary is to remove or detach the link 44 from its engagement with the extremity of the hook 43 which will permit the hook 43 to be detached from the aperture or opening 33 in the plate 31. If desired, a similar hook 45 may be provided intermediate the ends of the chain. With this improved construction, the chains 37 will maintain the body 35 in a horizontal position and when the body 35 rocks or surges, a strain or sudden jar will be imparted to one or the other of the chains 37 which will cause that chain to raise the end of the plate 31 to which it is connected and thereby compress the springs 29 of the truck from the bottom, while at the same time the cushioning effects of the springs on the truck bolster 24 will not be impaired. The springs 29 will thus act upon the chains 37 in the nature of a compensator and thereby prevent the chains from being damaged by the surging action of the car.

Figures 8, 9:
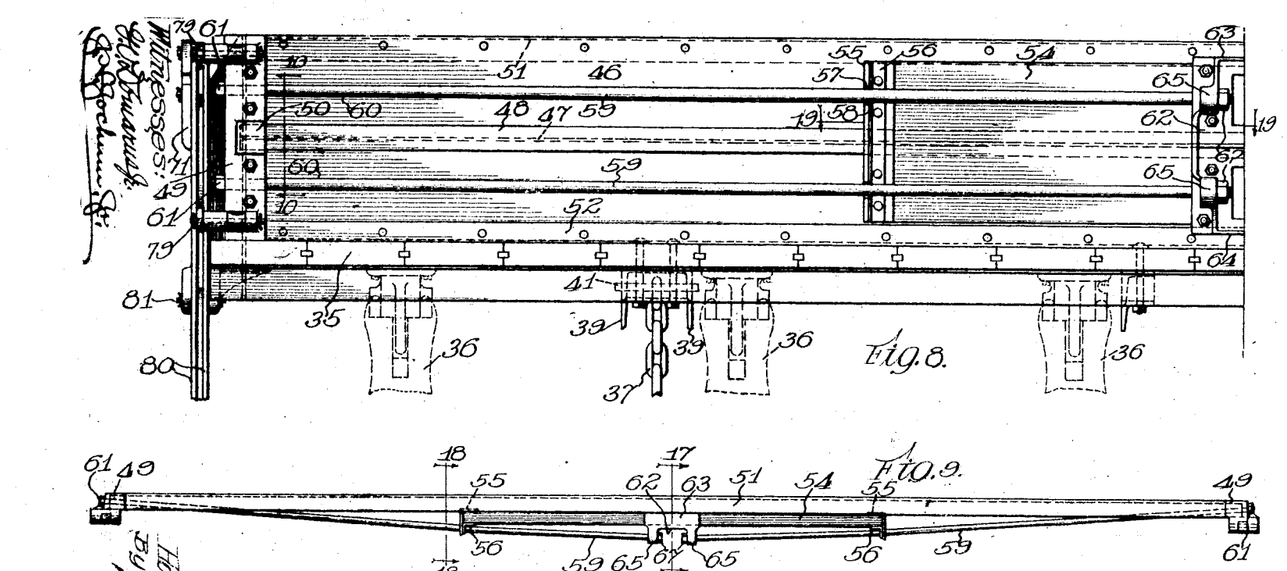
Fig. 8 is an elevation of one half of one of the side doors of the car.
Fig. 9 is a top plan view of one of the side doors.
Figure 10:
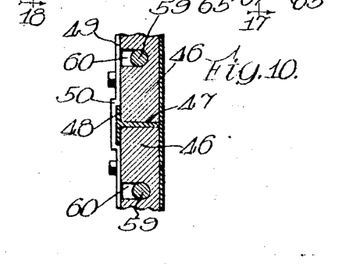
Fig. 10 is a detail sectional view on line 10—10, Fig. 8.
Figure 11:
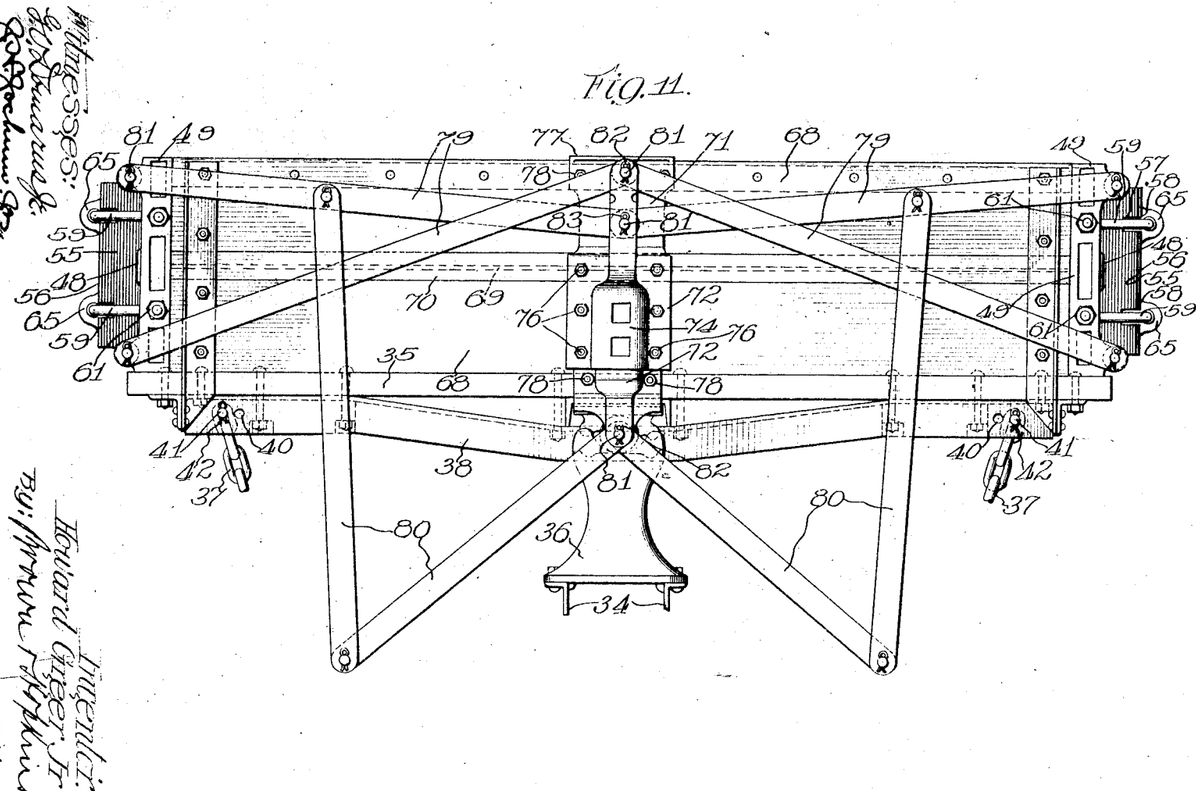
Fig. 11 is an elevation of one of the ends of the car body.
Figure 18:
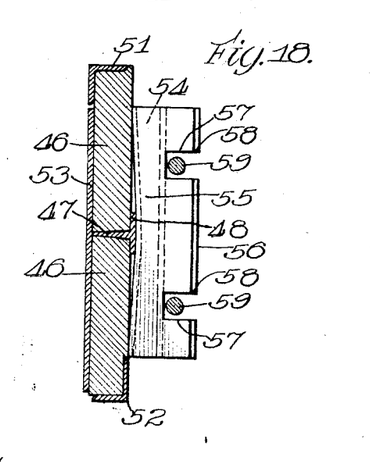
Fig. 18 is a sectional view on line 18—18, Fig. 9.
Figure 19:
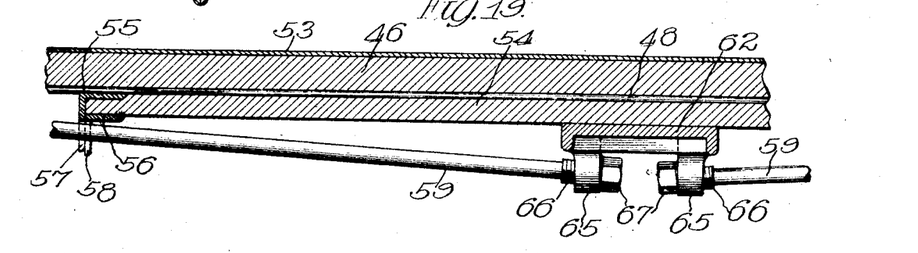
Fig. 19 is a sectional view on line 19—19, Fig. 8.

The doors constituting the sides of the car body comprise members 46 which may be constructed of any suitable material but preferably of wood and each is of a length to extend the entire length of the car. These members 46 are superposed with the edge of one member adjacent the edge of the other and a substantially T-shaped angle member having a web 47 and a body 48 is arranged so that the web 47 will project between the adjacent edges of the members 46 and with its body 48 engaging and resting against one face of each of the members 46 and overlapping the edges thereof. The body portion 48 of the T-shaped member prevents the members 46 from buckling with respect to each other and is held in position by means of end plates or members 49 resting against the ends of the members 46 and the adjacent portion of the face thereof. This end member 49 is provided with an offset portion 50 adapted to receive the body portion 48 of the T-shaped member, as shown more clearly in Figs. 8 and 10. An angle iron 51 is provided which covers the inner upper edge of the door, as shown more clearly in Fig. 18 so as to protect the edge of the door against wear or damage which would be caused by falling articles, and a similar angle iron 52 is arranged at the lower outer edge of the door so as to protect that edge thereof. A face plate 53 is secured to the inner face of the door and against which the members 46 rest. A member 54 which may be constructed of any suitable material, preferably wood, is arranged to overlap the joint formed by the adjacent edges of the members 46 and the angle member therebetween. This member 54 is of a width to extend for some distance on both sides of the body of the member 48 and also extends for some distance on each side of the longitudinal center of the door. An angle bar or member 55 is provided adjacent each end of the member 54 and which is of a substantially L-shaped formation. One of the flanges of the member 55 engages and extends across the end of the member 54 to project for some distance beyond the outer face thereof. The other flange of this angle member 55 extends between the adjacent portion of the member 54 and the members 46. Another angle bar or member 56 similar in construction to the angle member 55 is also provided adjacent each end of the member 54 and this angle member 56 is disposed so that one of its flanges engages and rests against the outer face of the end of the member 54 in close proximity to the flange of the angle member 55 which engages the end and extends beyond the outer face of the member 54. The other flange of the angle member 56 engages and rests against the last referred to flange of the angle member 55. These engaging flanges of the members 55 and 56 are respectively provided with apertures 57, 58, which register with each other and in which portions of truss rods or bars 59 are seated. One extremity of each of these truss rods or bars 59 projects into recesses 60 which open through the outer face of the members 46 and are closed by the end plates 49. The extremities of the truss bars or rods project beyond the end plates 49 and are provided on their free extremities with nuts or collars 61 which engage and rest against the portion of the end plates 49 which have engagement with the ends of the members 46.

Arranged at the longitudinal center of the door thus formed and resting against the outer face of the member 54 is a center plate designated generally by the reference numeral 62, which latter is provided with rearwardly projecting flanges 63, 64, at the top and bottom thereof and which flanges engage over and rest upon the upper and lower edges of the member 54. This center plate 62 is also provided with spaced laterally projecting ears or lugs 65, each of which is provided with an aperture therethrough and through which apertures one extremity of each of the truss rods or bars 59 project. The extremities of opposite truss rods or bars 59 terminate short of each other and are preferably threaded as at 66 to receive nuts or collars 67 which latter are located between opposite ears or projections 65. It will thus be seen that the center plate 62 acts in the nature of a turn buckle by means of which the truss bars or rods 59 may be tightened.

It will be apparent that a door constructed in this manner will be braced or reinforced throughout its entire length and that comparatively light material may be employed in its construction, while at the same time a door having a maximum amount of strength will be produced.

The front and rear ends of the car body are constructed in a similar manner and comprise two members 68 similar to the members 46, which are superposed in a similar manner and a reinforcing T-shaped member is provided, the web 69 of which projects between the adjacent extremities of the members 68 and the body 70 of which rests against the outer faces of these members.

Figure 12:
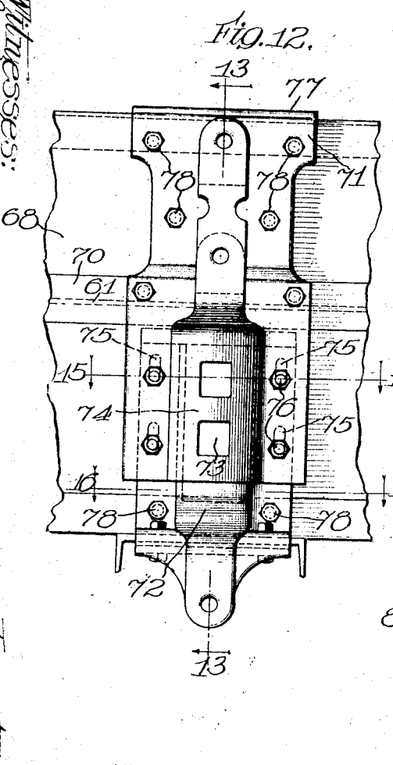
Fig. 12 is an elevation of the center plate of one of the ends of the car.
Figure 13:
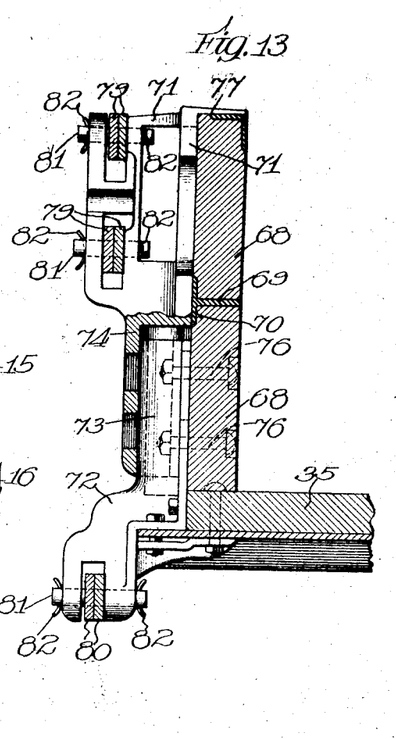
Fig. 13 is a sectional view on line 13—13, Fig. 12, with parts in elevation.
Figure 14:
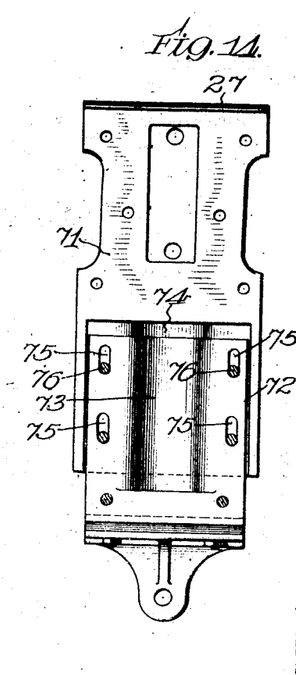
Fig. 14 is a rear view of the adjustable plates shown in Fig. 12.
Figure 15:
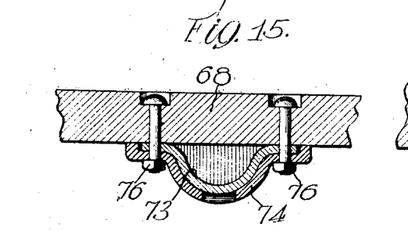
Fig. 15 is a detail sectional view on line 15—15, Fig. 12.
Figure 16:
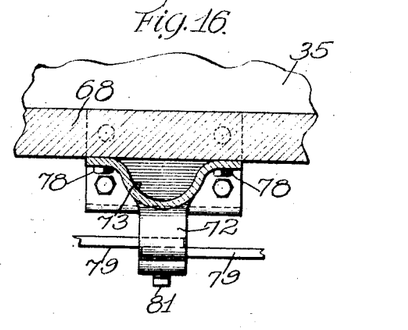
Fig. 16 is a detail sectional view on line 16—16, Fig. 12.
Figure 17:
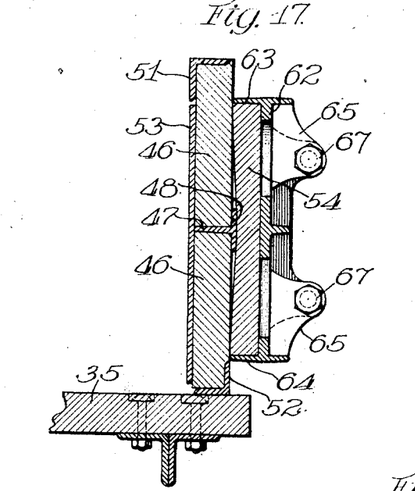
Fig. 17 is a detail sectional view on line 17—17, Fig. 9.

In order to provide means whereby the front and rear ends of the car may be constructed of varying heights without necessitating the construction of a center plate of various sizes to meet the varying conditions, the center plate is adjustably constructed and comprises two sections or members 71, 72, (see Figs. 12 to 14). One of these sections, the section 72, is provided with an offset portion 73 adjacent its center so as to extend longitudinally thereof, and the other section 71 is provided with a recessed portion 74 adapted to receive the offset portion 73. One of these sections, preferably the section 72, is provided with elongated slots 75 adapted to receive bolts or fastening devices 76, which latter pass through apertures in the adjacent portion of the section 71 so that by loosening the fastening devices 76 the two sections may be adjusted longitudinally with respect to each other and when thus adjusted the fastening devices may be again tightened to secure the parts in their adjusted positions with respect to each other. The section 71 is preferably provided with a flange 77 which is adapted to extend over and rest upon the top edge of the upper member 68. The center plate thus formed may be secured in position in any suitable manner, preferably by means of fastening devices 78 passing through the respective sections and the members 68.

The dumping links 79 are secured by one extremity to the section 71 of the center plate and by their other extremities to the respective side doors, and additional links 80 are provided which are connected to the other section 72 and one pair of the links 79.

In order to connect the ends of the links to the respective parts so that they may be readily detached, fastening pins or bolts 81, similar in construction to the fastening pins or bolts 41 are provided. These fastening bolts comprise a pin which passes through the links and the adjacent member to which they are connected and are themselves held against displacement by means of cotter pins 82 which pass through the extremities of these fastening devices 81. It will thus be seen that the pins or fastening devices 81 may be removed or detached by removing either one of the cotter pins 82.

What is claimed as new is—

1. In a dumping car, the combination of bolster springs, a dumping body, body chains for maintaining the body against dumping movement, and means connecting the chains with the said springs.

2. In a dumping car, the combination of bolster springs, a dumping body, body chains for maintaining the body against dumping movement, and means connecting the chains with the base of the springs.

3. In a dumping car, the combination of bolster springs, a dumping body, body chains for maintaining the body against dumping movement, means for compressing the springs from the bottom thereof, and means connecting the body chains with the last recited means.

4. In a dumping car, the combination of bolster springs, a dumping body, body chains for maintaining the body against dumping movement, means for compressing the springs from the bottom thereof, and means for detachably connecting the body chains with the last recited means.

5. In a dumping car, the combination of a dumping body, body chains, bolster springs, and means connected with the body chains adapted to act upon the said springs in opposition to the action of the bolster on the springs.

6. In a dumping car, the combination of a dumping body, body chains, bolster springs, means engaging the lower ends of the springs adapted to act upon the springs in opposition to the action of the bolster, to compress the springs, and means detachably connecting the said chains to the last recited means.

7. In a dumping car, the combination of a dumping body, bolster springs, flexible members, means loosely connecting said members with the said body for free movement with respect thereto, and means connected with said flexible members and adapted to act upon the springs.

8. In a dumping car, the combination of a dumping body, bolster springs, flexible members for maintaining the said body against dumping movement, and means whereby the said springs will compensate the strain on said flexible members.

9. In a dumping car, the combination of a dumping body, bolster springs, flexible members, means connecting one end of said members with the said body for free and bodily movement with respect thereto, and means also connecting said flexible members with the bolster springs.

10. In a dumping car, the combination of a dumping body, bolster springs, flexible members, means connecting one end of the members with the said springs, spaced supports connected with the car body, a fastening pin passing through the supports and with which the flexible member has loose engagement between the supports, and pins passing through the first said pins outside of said supports.

11. In a dumping car, the combination of a dumping body, bolster springs, means engaging the springs for creating a tension thereon in opposition to the bolster, body chains, means loosely connecting one end of the chains with the body for free bodily movement with respect thereto, a connecting hook secured to the chain adapted to detachably engage the first recited means, and a closure for the hook.

12. In a dumping car, the combination of a dumping body, bolster springs, means engaging the springs for creating a tension thereon in opposition to the bolster, body chains, means loosely connecting one end of the chains with the body for free bodily movement with respect thereto, a connecting hook secured to the chain and adapted to detachably engage the first recited means, and means for securing the said hook against accidental disengagement with respect to the first recited means.

13. In a dumping car, the combination of a truck, a bolster spring support, springs supported thereby, body chains, means connecting one end of the chains with the body, a member disposed between the springs and the spring support, and means connecting the other ends of the chains with the said member.

14. In a dumping car, the combination of a truck, a bolster spring support, springs supported thereby, a bolster having engagement with the springs, body chains, means connecting one end of the chains with the body, and a member disposed between the springs and the spring support and projecting beyond the end of the bolster, the free ends of the chains having detachable engagement with the projecting ends of the said member.

15. In a dumping car, the combination of a truck, a bolster spring support, springs supported thereby, a bolster having engagement with the springs, body chains, means connecting one end of the chains with the body, and a member disposed between the springs and the spring support and projecting beyond the end of the bolster, the free ends of the chains having detachable engagement with the projecting ends of the said member, said member being provided with a flange projecting between the springs.

In testimony whereof I have signed my name to this specification, in the presence of two subscribing witnesses, on this 10th day of November A. D. 1910.

HOWARD GREER, Jr.

Witnesses:
FREDERICK P. LUTHER,
J. H. JOCHUM, Jr.